United States Patent [19]
Leimer

[11] Patent Number: 6,081,228
[45] Date of Patent: Jun. 27, 2000

[54] RECEIVER PHASE-NOISE MITIGATION

[75] Inventor: Donald Leimer, Rancho Palos Verdes, Calif.

[73] Assignee: SiRF Technology, Inc., Santa Clara, Calif.

[21] Appl. No.: 09/153,680

[22] Filed: Sep. 15, 1998

[51] Int. Cl.[7] .............................. H04B 7/185; G01S 5/02
[52] U.S. Cl. .................. 342/357.02; 701/214; 455/296
[58] Field of Search .............................. 342/357.02, 442; 701/214; 455/296

[56] References Cited

U.S. PATENT DOCUMENTS

| | | | |
|---|---|---|---|
| 4,675,880 | 6/1987 | Davarian | 375/39 |
| 5,793,818 | 8/1998 | Claydon et al. | 375/326 |
| 5,901,183 | 5/1999 | Garin et al. | 375/343 |

OTHER PUBLICATIONS

Barnes, "Characterization of Frequency Stability" IEEE Transactions on Instrumentation and Measurement, May 1971, pp. 105–120.

*Primary Examiner*—Theodore M. Blum
*Attorney, Agent, or Firm*—Fulwider Patton Lee & Utecht, LLP

[57] ABSTRACT

A Global Positioning System receiver incorporating a method of reducing the effect of common mode oscillator phase noise. Oscillator phase noise in the receiver is a basic limitation on narrowing the carrier tracking loop bandwidth and, therefore, on the achievable carrier-track C/No for a GPS receiver tracking a single satellite signal. However, when receiving several satellite signals, the receiver phase noise is common to all tracking loops and, in principle, can be removed by a common-mode rejection scheme. The phase noise contributed by the satellites is negligible in comparison with the phase noise contributed by the receiver's oscillator; hence, the common-mode rejection is improved by tracking multiple satellite signals.

26 Claims, 7 Drawing Sheets

ISOLATION OF CARRIER TRACKING LOOPS FROM OSCILLATOR PHASE PERTURBATIONS.

ISOLATION OF CARRIER TRACKING LOOPS FROM
OSCILLATOR PHASE PERTURBATIONS.

SUB-OPTIMAL, 2-CHANNEL TRACKING WITH
COMMON-MODE, PHASE-NOISE REJECTION

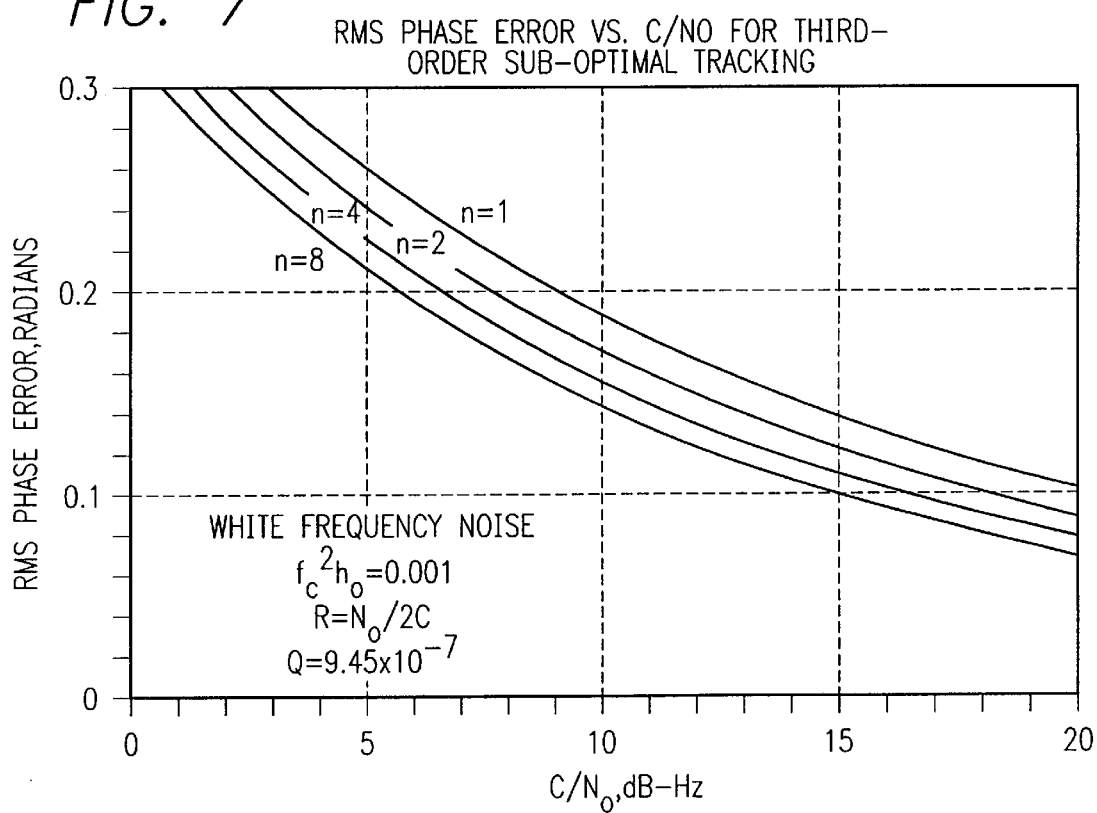
FIG. 7 RMS PHASE ERROR VS. C/NO FOR THIRD-ORDER SUB-OPTIMAL TRACKING
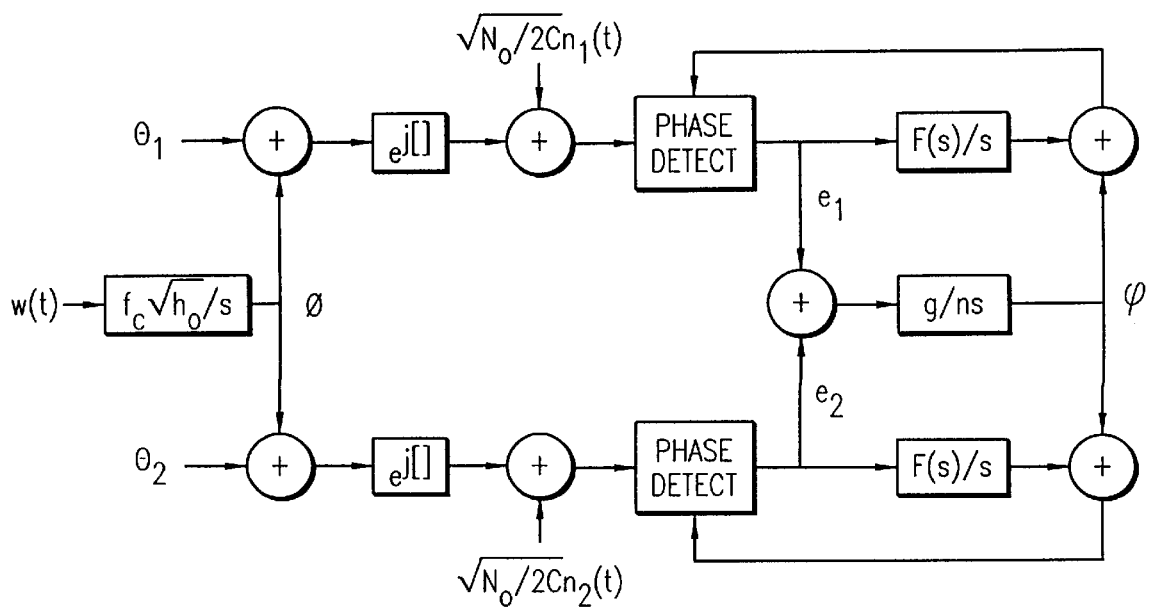
FIG. 8 SIMULATION MODEL OF WHITE-FREQUENCY NOISE AND TWO CHANNELS

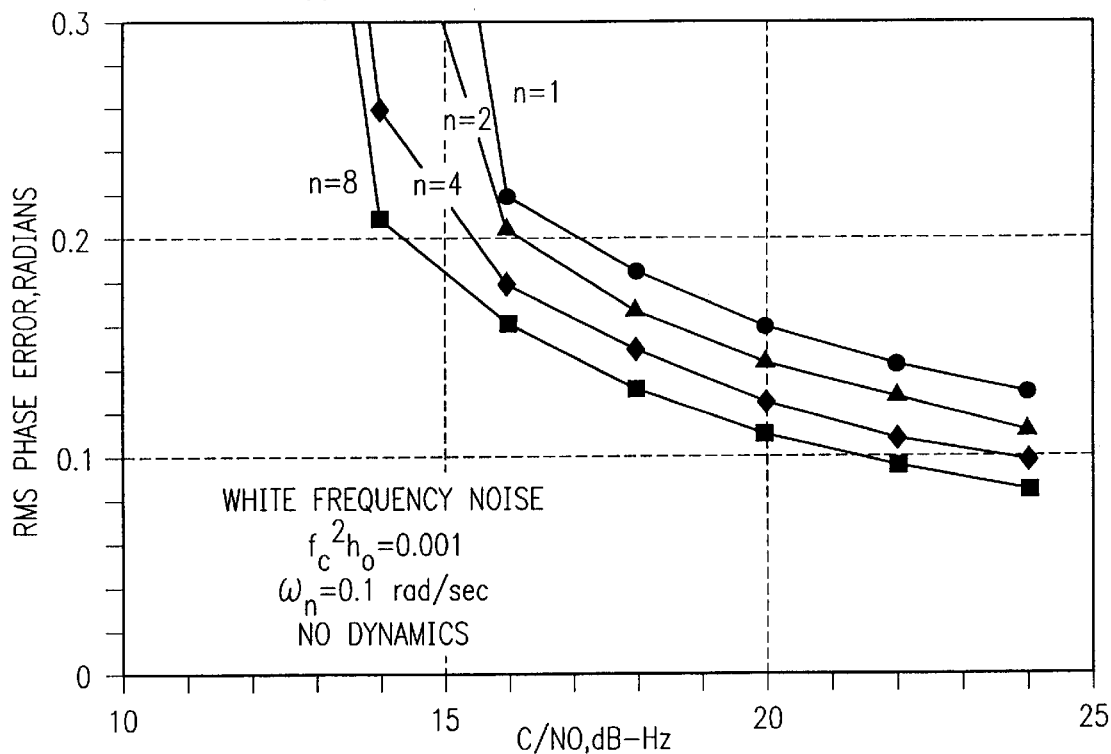
FIG. 11 SIMULATION RESULTS OF THIRD-ORDER COSTAS TRACKING WITH PHASE-NOISE REJECTION
WHITE FREQUENCY NOISE
$f_c^2 h_0 = 0.001$
$\omega_n = 0.1$ rad/sec
NO DYNAMICS
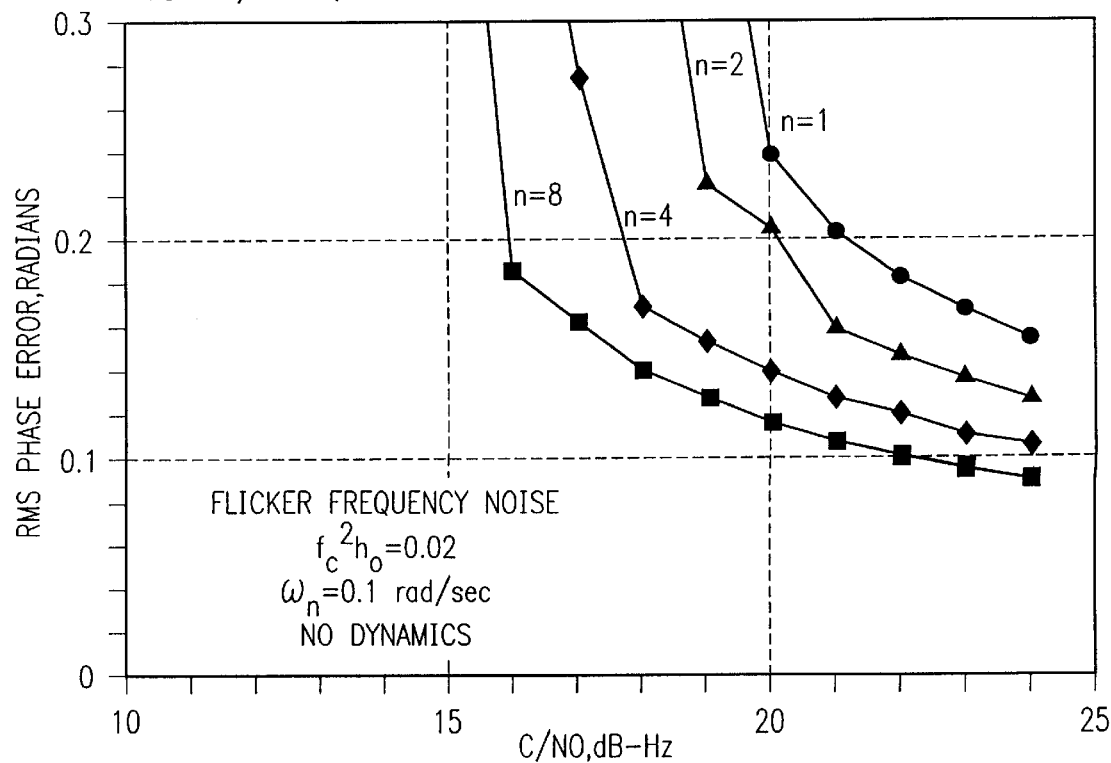
FIG. 12 SIMULATION RESULTS OF SECOND-ORDER COSTAS TRACKING WITH 1/f FREQUENCY NOISE AND FIRST-ORDER PHASE-NOISE ESTIMATOR
FLICKER FREQUENCY NOISE
$f_c^2 h_0 = 0.02$
$\omega_n = 0.1$ rad/sec
NO DYNAMICS

RECEIVER PHASE-NOISE MITIGATION

The U.S. Government has a paid-up license in this invention and the right in limited circumstances to require the patent owner to license others on reasonable terms as provided for by the terms of N66001-97-C-8633 awarded by the Defense Advanced Research Projects Agency.

BACKGROUND OF THE INVENTION

1. Field of the Invention

This invention relates to the reduction of phase noise in a multichannel radio receiver where the multiple channels share a common clock.

2. Description of Related Art

One example of a radio receiver with multiple channels which share a common clock is a receiver adapted to receive the signals of the NAVSTAR Global Positioning System (GPS) satellites. The GPS system consists of a number of satellites orbiting the earth. Each satellite contains a precise oscillator which provides the basic clocking signal for that satellite. Each satellite broadcasts one or more carrier signals each of which is modulated by a set of pseudo-random code sequences unique to that satellite. Each satellite broadcasts modulated carrier signals at the same set of frequencies, typically called L1 and L2, because the satellites broadcast in the L band of frequencies.

A typical GPS receiver consists of one or more separate channels, each channel being assigned to tracking one of the satellite signals available at the receivers position. Most modern GPS receivers have the facility to track the recovered carrier phase of the satellite signal by use of either a Phase Locked Loop (PLL) or Costas Phase detection loop (Costas Loop). The bandwidth of these tracking loops directly affect the ability of the receiver to acquire or track signals during periods of high receiver dynamics or in the presence of a jamming signal.

Oscillator phase noise in the receiver is a basic limitation on narrowing the carrier tracking loop bandwidth and, therefore, on the achievable carrier-track $C/N_0$ for a GPS receiver tracking a single satellite signal, where $C/N_0$ is the ratio of carrier signal to noise relative to a one Hertz bandwidth. However, when receiving several satellite signals, the receiver phase noise is common to all tracking loops and, in principle, can be removed by a common-mode rejection scheme. The phase noise contributed by the satellites is negligible in comparison with the phase noise contributed by the receiver's oscillator; hence, the common-mode rejection can be improved by tracking multiple satellite signals.

Traditionally the method for reducing the common phase noise in a GPS receiver is to use a higher quality and by extension higher cost oscillator. Use of the disclosed method allows a GPS receiver to achieve higher performance with an existing oscillator or to maintain a desired performance while allowing the use of lower cost crystal oscillators.

SUMMARY OF THE INVENTION

Briefly and in general terms the present invention provides a method and apparatus to estimate the common phase-noise component in a GPS receiver, which may then be removed prior to coherent tracking of each satellite. Removal of the phase-noise permits coherent operation with narrower loop bandwidths for higher Jammer to Signal (J/S) performance in inertial-aided receiver systems. Alternatively, receivers can use lower quality oscillators to lower cost, but provide equivalent measurement quality. Applying the method of estimating and removing the common phase-noise results in reduced phase-tracking errors, and thus lower tracking thresholds. The performance improvement increases as the number of satellite signals are simultaneously tracked; tracking improvements up to 6 dB can be shown for 8-satellite reception.

One embodiment of the claimed invention is a Global Positioning System (GPS) Receiver consisting of more than one receiving channels, each receiving channel being adapted to track the carrier phase portion of the signal broadcast from one of the orbiting GPS satellites, each receiving channel deriving its timing signals from a single common clock source such as a crystal oscillator. This receiver will also include a tracking filter for estimating the phase noise of the common clock source by processing measurements from the receiving channels that are actively tracking the carrier phase of the satellites' signals. This filter is designed to track the phase noise of common clock source and then deliver that estimate of phase noise back into the sections of the receiver channels adapted to track the carrier phase to remove common clock phase noise from each channels' measurement of satellite carrier phase.

Another of the claimed embodiments is a method of improved GPS signal tracking in the presence of a jamming signal by first acquiring and tracking the carrier phase of two or more satellites outside the presence of jamming using a wide bandwidth. The common mode receiver phase noise is then acquired and tracked in a tracking loop. This estimate of common mode phase noise is added to the carrier phase tracking loops to remove the common mode phase noise from the estimate of carrier phase. This allows the bandwidths of the carrier phase tracking to be narrowed relative to the number of signals contributing to the common mode receiver phase noise tracking loop thereby increasing the receivers resistance to a jamming signal.

While the examples and embodiments disclosed in general refer to Global Position System receivers, the methods and apparatus disclosed would be applicable to any receiver where multiple signals are received simultaneously and each of the receiver channels receives timing information from a common clock source.

DESCRIPTION OF THE DRAWINGS

FIG. 7. RMS Phase Error vs. $C/N_0$ for Third-Order Sub-optimal Tracking.

FIG. 8. Simulation Model of White-Frequency Noise and Two Channels.

FIG. 11. Simulation Results of Third-Order Costas Tracking with Phase-Noise Rejection.

FIG. 12. Simulation Results of Second-Order Costas Tracking with 1/f Frequency Noise and First-Order Phase-Noise Estimator.

DETAILED DESCRIPTION OF THE PREFERRED EMBODIMENTS

A typical Global Positioning System (GPS) receiver consists of one or more separate channels, each channel being assigned to tracking one of the satellite signals available at the receivers position. One example of a modern GPS receiver can be found in pending U.S. patent application Ser. No. 08/638,021 filed Apr. 25, 1996 entitled "Triple Multiplexing Spread Spectrum Receiver," which is incorporated by reference herein. Most modern GPS receivers have the facility to track the recovered carrier phase of the satellite signal by use of either a Phase Locked Loop (PLL) or Costas Phase detection loop (Costas Loop). The bandwidth of these tracking loops directly affect the receivers ability to acquire or track signals during periods of high receiver dynamics or in the presence of a jamming signal.

Figure 1:
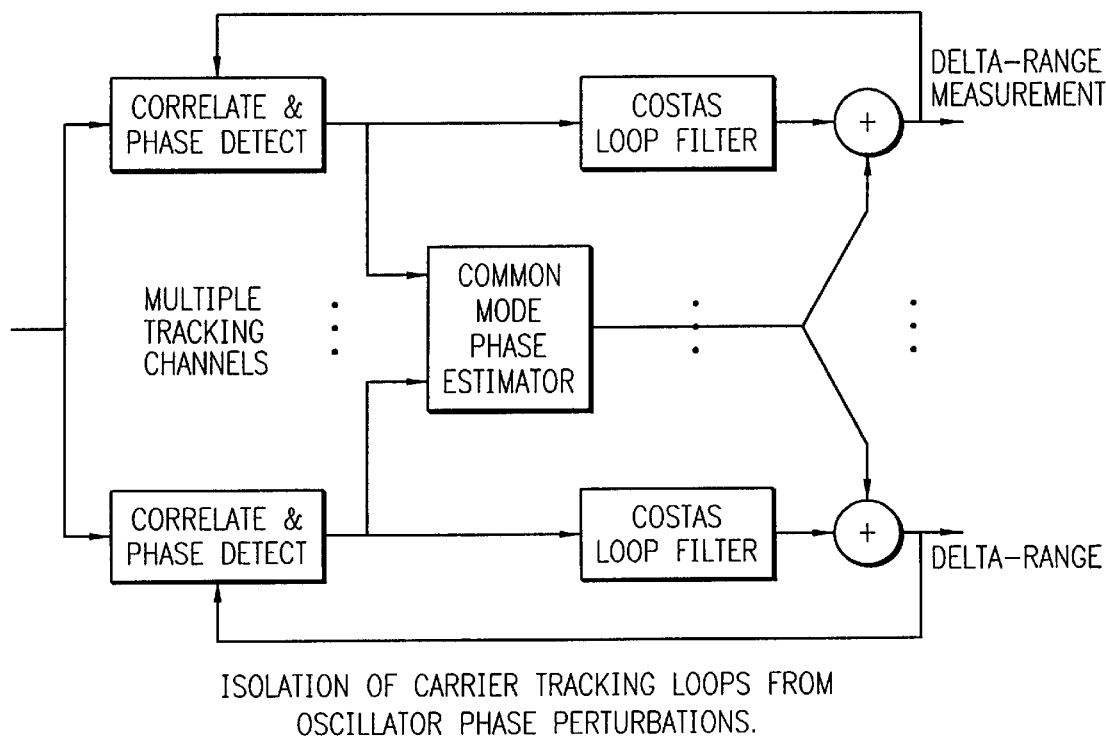
FIG. 1. Common mode rejection scheme by Isolation of Carrier Tracking Loops from Oscillator Phase Perturbations.

Oscillator phase noise in the receiver is a basic limitation on narrowing the carrier-tracking loop bandwidth, and therefore, on the achievable (carrier track) J/S for a GPS receiver tracking a single satellite signal. However, when receiving several satellite signals, the receiver phase noise is common to all tracking loops, and in principle, can be removed by a common-mode rejection scheme as suggested by FIG. 1. The phase noise contributed by the satellites is negligible in comparison with the phase noise contributed by the receiver's oscillator; hence, the common-mode phase estimation is improved by coherently combining the strength of multiple signals. The estimated common-phase perturbation is removed by the feedback loop to the phase detector, and the Costas loop must only track the non-common portion of the received signal phase.

The estimation problem is initially formulated as a multiple-state estimation problem that models the common-phase dynamic process with one or more states, and each signal phase with two or three states (i.e., second- or third-order tracking). Consequently, third-order tracking loops for 8 signals with a first-order, common-phase estimator requires 25 state variables. The optimal linear solution is derived and evaluated. A sub-optimal solution that decouples the signal-phase tracking from the common-phase estimation is then postulated, derived, and evaluated using linear analysis. The non-linear effects of phase detection are studied using computer simulations. Simulations are performed to evaluate the tracking and acquisition performance as the $C/N_0$ is reduced for 1, 2, 4, and 8 simultaneous signal-tracking channels. Threshold-extension performance is predicted by comparing the $C/N_0$ required for a given RMS phase-tracking error such as 0.2 radians.

Optimal Linear Solution

The solution for a two-channel system is derived, and the extension to "n" channels, including n=1, is straightforward. The optimal linear estimator for the two-channel system is formulated by defining the composite state vector $$x(t) = [\phi \theta_1 \dot{\theta}_1 \theta_2 \dot{\theta}_2]$$

for second-order dynamics, where $\phi$ is the oscillator phase noise and $\theta_i$ is the phase of the ith signal channel. The linear model of the two-channel system, with the oscillator phase noise modeled as white frequency noise, is therefore $$\dot{x}(t) = \begin{bmatrix} 0 & 0 & 0 \\ 0 & F & 0 \\ 0 & 0 & F \end{bmatrix} x(t) + \begin{bmatrix} 1 & 0 & 0 \\ 0 & G & 0 \\ 0 & 0 & G \end{bmatrix} \begin{bmatrix} w_0(t) \\ w_1(t) \\ w_2(t) \end{bmatrix}$$

where $w_0(t)$ is the white frequency noise with $$E[w_0(t)w_0(\tau)] = \frac{f_c^2 h_0}{2}\delta(t-\tau)$$

and $w_i(t)$ is the white dynamics noise for the ith signal with $$E[w_i(t)w_i(\tau)] = Q\delta(t-\tau)$$

and F and G are defined to produce an nth-order Wiener noise process. The parameter $h_0$ is the intensity of the normalized phase-noise spectrum as defined by Barnes in *Characterization of Frequency Stability* (IEEE Transactions on Instrumentation and Measurement. Vol. IM-20, No. 2, May 1971), and $f_c$ is the carrier frequency of 1575.42 MHz. A typical value of $f_c^2 h_0$ is 0.001 for a TCXO crystal oscillator.

The signal phases are observed by phase detection, $$z(t) = \sin(\theta - \hat{\theta}) + v(t)$$

which is linearized as $$z(t) = \begin{bmatrix} e_1 \\ e_2 \end{bmatrix} \approx H[x(t) - \hat{x}(t)] + \begin{bmatrix} v_1(t) \\ v_2(t) \end{bmatrix},$$

where $$H = \begin{bmatrix} 1 & 1 & \ldots & 0 & \ldots \\ 1 & 0 & \ldots & 1 & \ldots \end{bmatrix}, \hat{x}(t) = E[x(t)], E[v(t)v(\tau)] = R\delta(t-\tau)$$

and $R=N_0/2C$ for phase-locked carrier-phase detection and $R=(1+N_0/2CT_b)N_0/2C$ for Costas suppressed-carrier phase detection with a coherent integration interval of $T_b$.

The optimal linear estimator, using the Kalman-Bucy formulation, has a steady-state covariance solution given by $$\dot{P} = FP + PF^T - PH^T R^{-1} HP + GQG^T = 0$$

where $$\dot{P} = E[(\hat{x}-x)(\hat{x}-x)^T].$$

Figure 2:
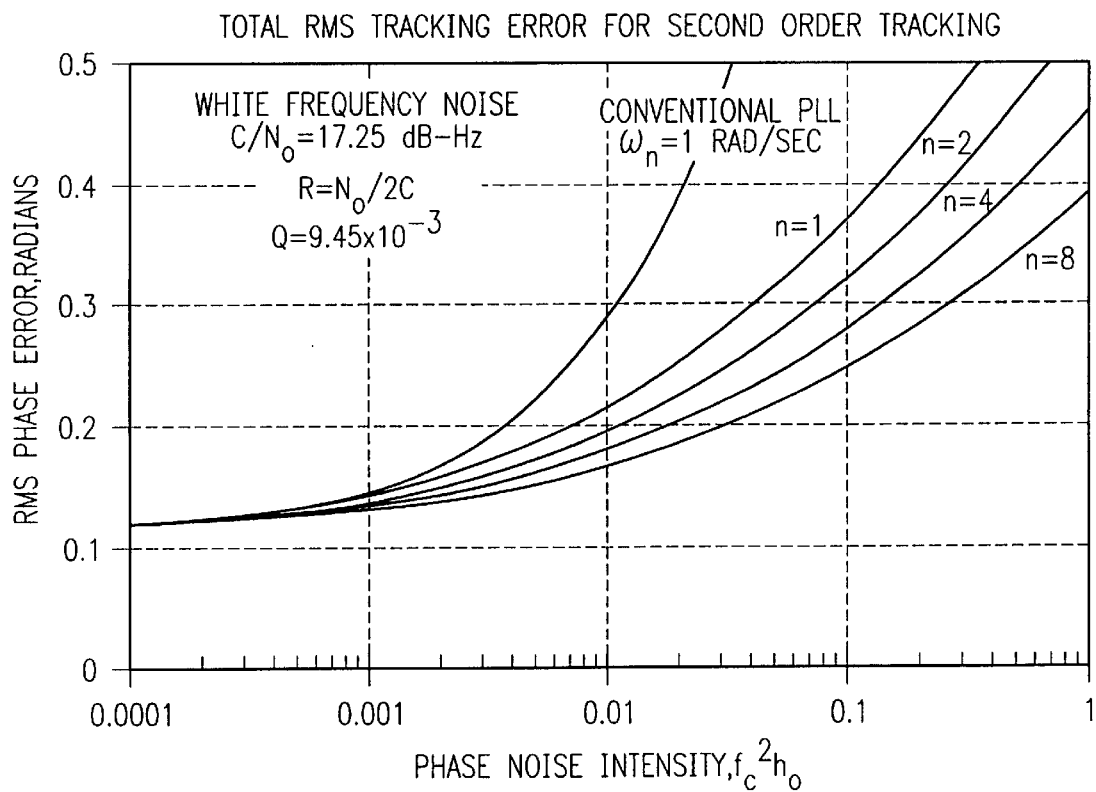
FIG. 2. Total RMS Tracking Error for Second-Order Tracking in Optimal Linear Solution.

The RMS tracking, or observation, error $e_i$ is plotted in FIG. 2 as $h_0$ increases and for n=1, 2, 4, and 8 channels. Also, the RMS error for a conventional PLL with $w_n = (Q/R)^{1/4}$. The fundamental difference between the conventional PLL and the "n=1" case is that the later makes use of the phase-noise model and widens the loop bandwidth. FIG. 2 shows that the optimal solution is capable of accommodating a larger phase noise with the same RMS tracking error as "n" increases from 1 to 8.

Figure 3:
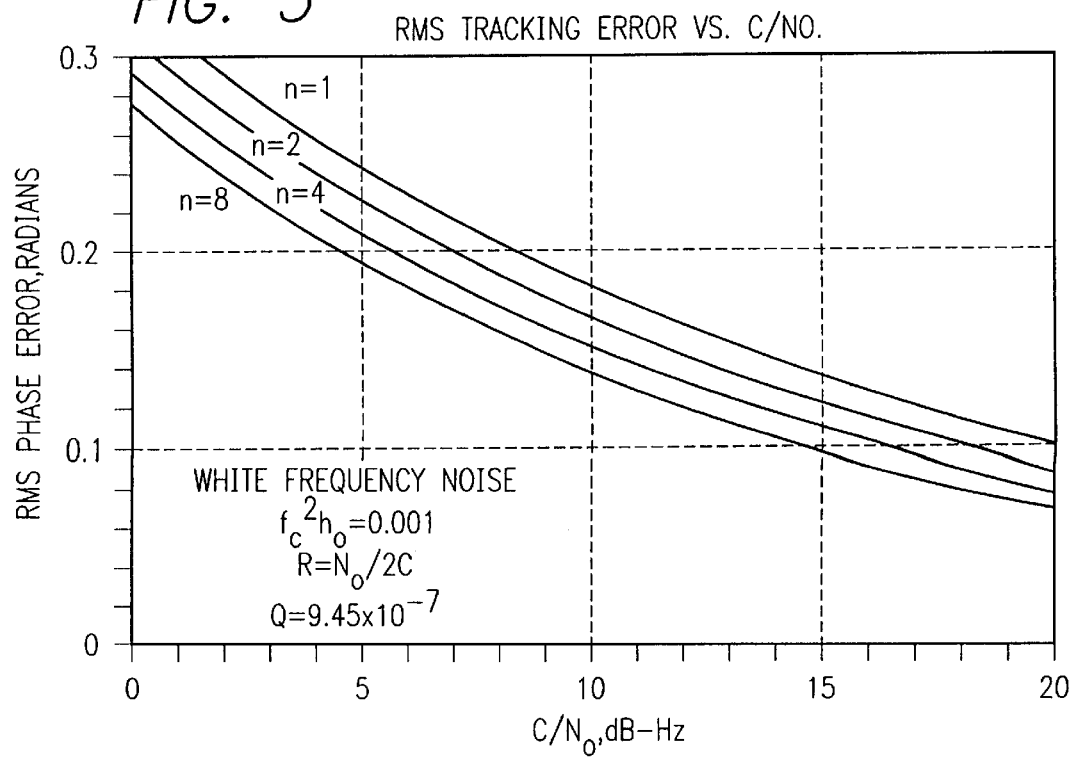
FIG. 3. RMS Tracking Error vs. $C/N_0$ for Optimal Linear Solution.

Another perspective is shown in FIG. 3. The receiver $C/N_0$ is varied while holding $h_0$ fixed. By using all channels to estimate the common, oscillator phase noise, a lower $C/N_0$ can be accommodated for a given RMS phase error. For example, the $C/N_0$ that "n=8" yields 0.2 radians RMS error is 4 dB lower than that for "n=1". Since the nominal threshold for Costas tracking is 0.2 radians RMS, a threshold extension of 4 dB may be expected.

Similar results can be derived for third-order tracking.

Sub-Optimal Linear Solution

Figure 4:
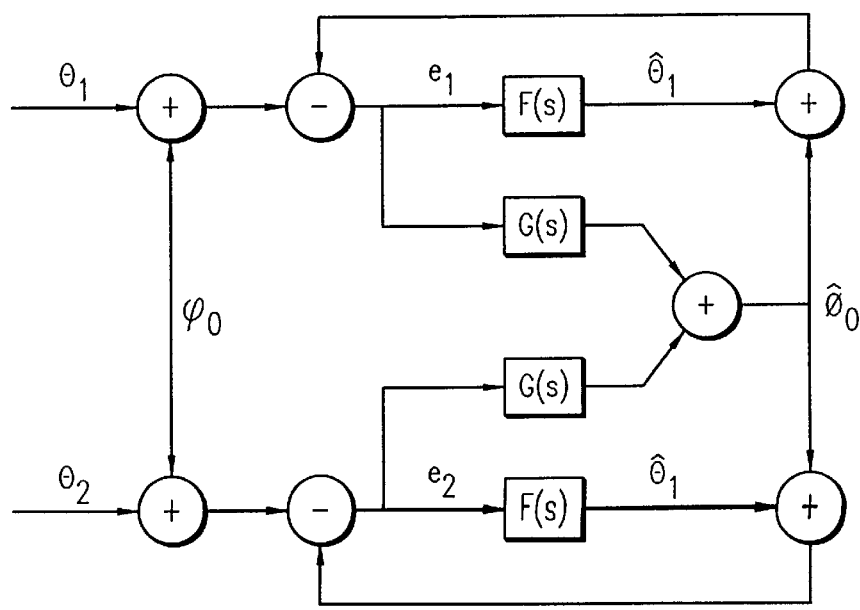
FIG. 4. Sub-optimal, 2-Channel Tracking with Common-Mode, Phase-Noise Rejection

The optimal solution derived above has complexity $(nm)^2$ for n channels and m-order signal tracking, where complexity is the number of multiplies in the filter. A lower complexity solution is now conjectured, analyzed, and found to provide nearly as good improvement as the optimal solution. The proposed sub-optimal solution is shown for the two-channel case in FIG. 4.

The concept being conjectured is to assume that the estimation of oscillator phase noise and the signal phase dynamics are separable, such that:

F(s) is the Min. Mean Square Error estimate of $\theta_i$ with $\hat{\Phi}_0 = \phi_0$, G(s) is the Min. Mean Square Error estimate of $\Phi_0$ with $\hat{\theta}_i = \theta_i$.

For this case, F(s) is given by the conventional PLL solution which is optimized without considering oscillator phase noise, and G(s) is found using the linear optimization method. For a white frequency phase noise model, $$G(s) = \frac{g}{s} \text{ where } g = \sqrt{\frac{f_c^2 h_0}{2nR}}, R = N_0/2C,$$

and n is the number of signal channels.

The effectiveness of this approach is now evaluated using linear analysis; further evaluations using computer simulations are reported in a later section. The covariance of the tracking errors are computed from the steady-state solution $$\dot{P} = AP + PA^T + K\Pi K^T + \Gamma = 0$$

where $$A = [F - KH], \Pi = \begin{bmatrix} R & 0 \\ 0 & R \end{bmatrix}, \text{ and } \Gamma = \begin{bmatrix} f_c^2 h_0 & 0 & 0 \\ 0 & GQG^T & 0 \\ 0 & 0 & GQG^T \end{bmatrix}$$

for a two-channel system. The gain matrix, K, is $$K = \begin{bmatrix} g & g \\ \sqrt{2}\omega_n & 0 \\ \omega_n^2 & 0 \\ 0 & \sqrt{2}\omega_n \\ 0 & \omega_n^2 \end{bmatrix}$$

for second-order dynamics, and $$K = \begin{bmatrix} g & g \\ 2\omega_n & 0 \\ 2\omega_n^2 & 0 \\ \omega_n^3 & 0 \\ 0 & 2\omega_n \\ 0 & 2\omega_n^2 \\ 0 & \omega_n^3 \end{bmatrix}$$

for third-order dynamics.

Figure 5:
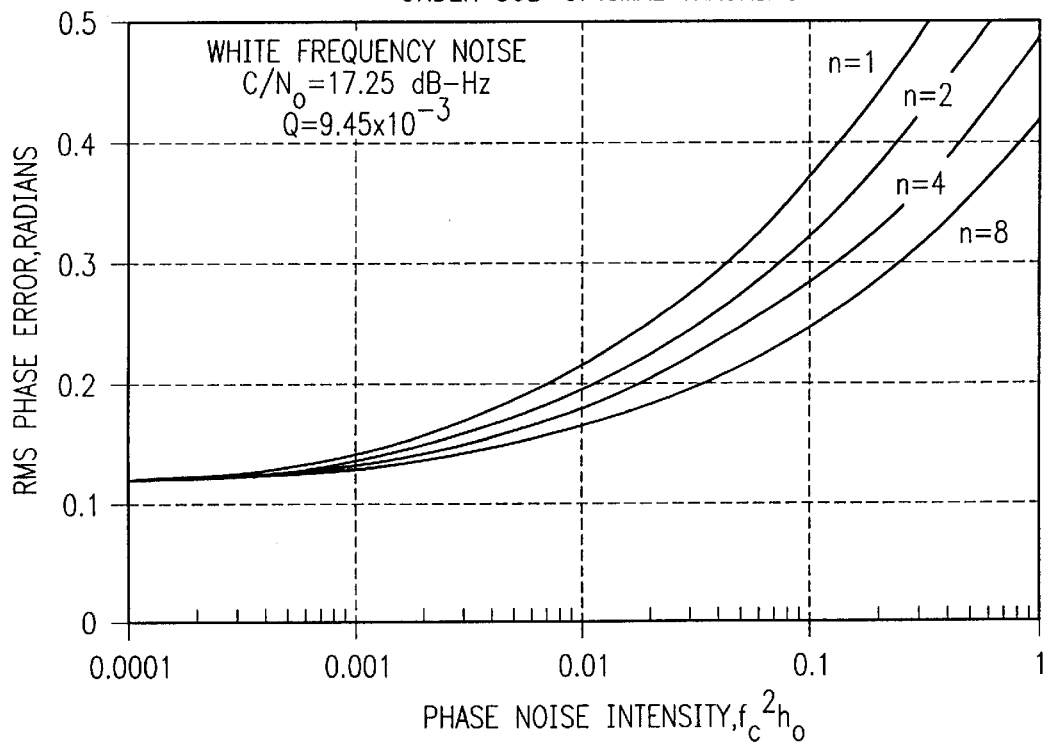
FIG. 5. Composite RMS Phase Error versus Oscillator phase noise for Second-Order Sub-optimal Tracking FIG. 6. RMS Phase Error vs. $C/N_0$ for Second-Order Sub-optimal Tracking.
Figure 6:
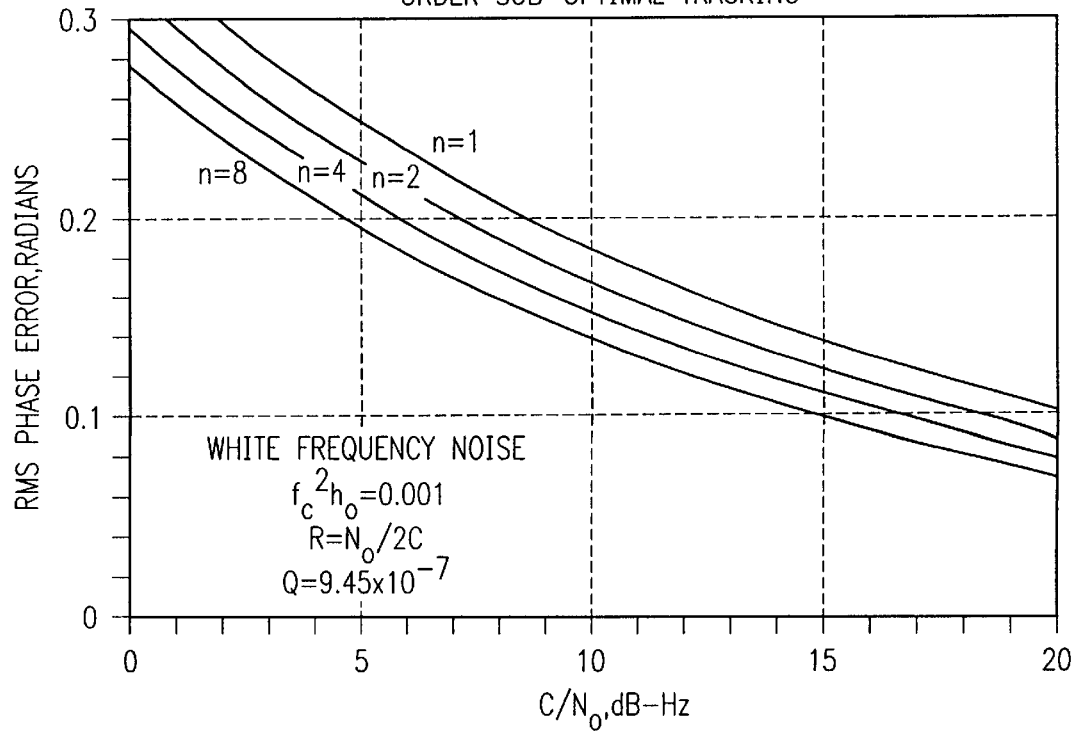

The steady-gain solution is solved using numerical methods. FIG. 5 shows the RMS tracking error versus the intensity of the oscillator phase noise for second-order tracking, and compares favorably with the optimal performance in FIG. 2. Similarly, the RMS error versus $C/N_0$ for the sub-optimal implementation, as shown in FIGS. 6 and 7, is essentially as small as with the optimal performance.

Computer Simulations

Carrier-tracking is fundamentally a nonlinear process due to the phase ambiguity of the phase-detection process. Consequently, computer simulations are used to evaluate the non-linear behavior of the common-mode rejection technique.

FIG. 8 shows the simulation model for the two-channel case with the oscillator phase noise, $\Phi$, modeled as white-frequency noise. The two signal phases are $\theta_1$ and $\theta_2$; both are assumed to be 0 (no dynamics) in this simulation. The signal phase is added to the oscillator phase noise, and the resulting baseband I-Q phasor is generated. White Gaussian noise is added to the I-Q phasor before phase detection. Both PLL and Costas phase detection are simulated as follows:

PLL Detection: e=Isin(-φ)+Qcos(-φ)

Costas Detection: e=[Isin(-φ)+Qcos(-φ)]sgn(Icos(-φ)-Qsin(-φ))

where φ is the phase estimate fed back from the output of the loop filter and common-mode estimator.

Figure 9:
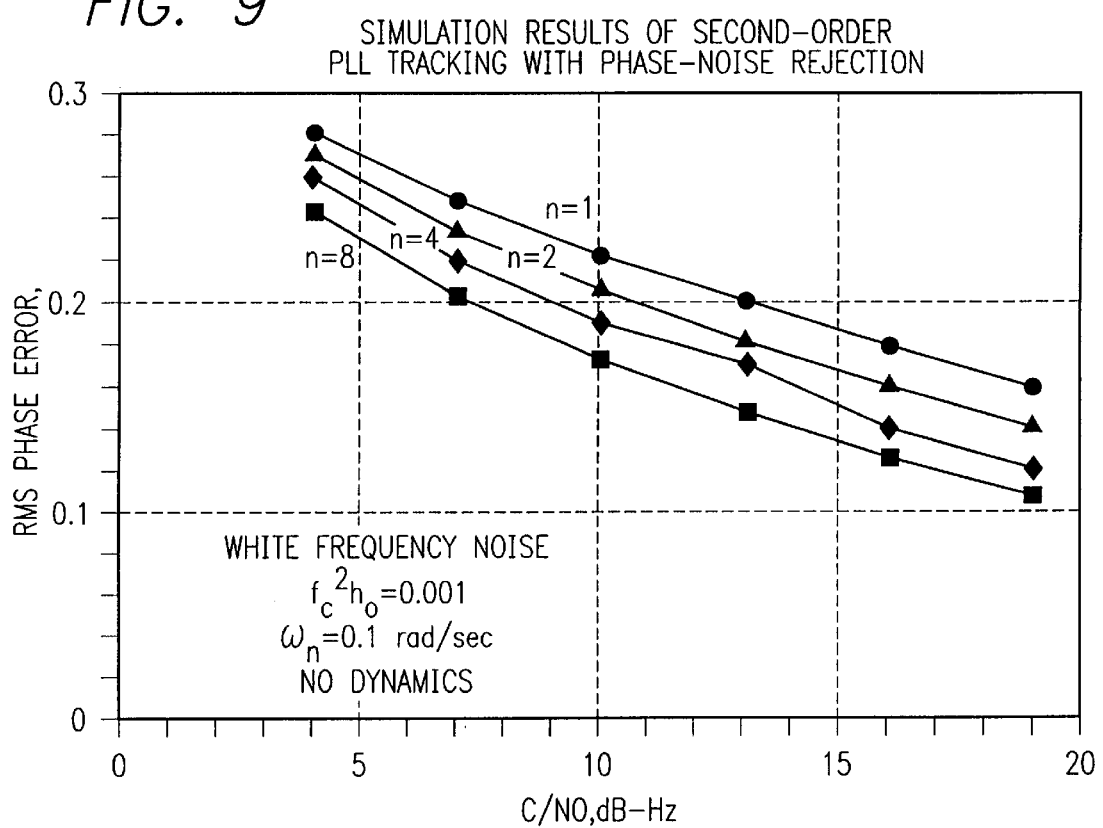
FIG. 9. Simulation Results of Second-Order PLL Tracking with Phase-Noise Rejection.

FIG. 9 plots the simulation results for PLL tracking with n=1, 2, 4, and 8 signals as the $C/N_0$ is varied. If the loop threshold is defined to be $s_e$=0.2 radian, the tracking threshold is extended from 13 to 5 dB-Hz, or 6 dB.

The simulation results demonstrate threshold extension that is comparable to the linear analysis plotted in FIG. 6. However, the phase error does not decrease with $C/N_0$ as rapidly; this is due to the fact that the analysis assumes that the loop $w_n$ is optimized at each $C/N_0$, and the simulations use the same bandwidth, $\omega_n$=0.1, for all $C/N_0$ values. This bandwidth is picked empirically at the $C/N_0$ corresponding to $\sigma_\theta$~0.2 rad.

Figure 10:
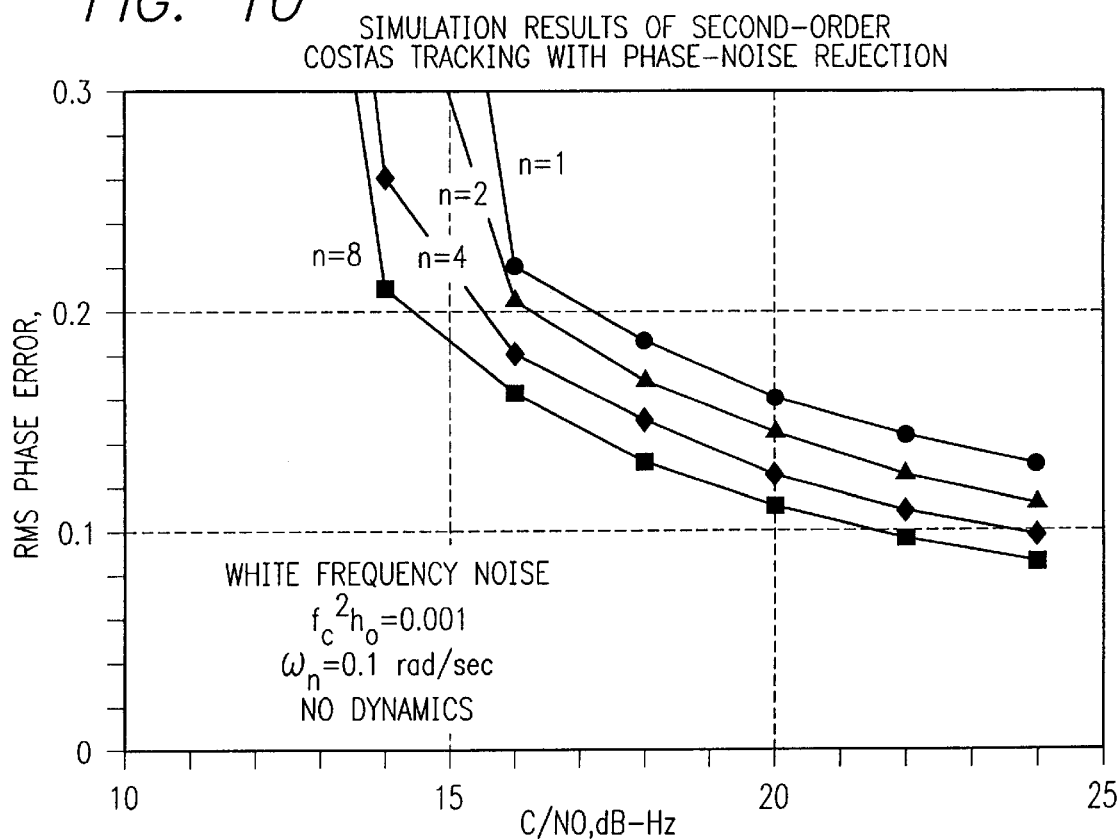
FIG. 10. Simulation Results of Second-Order Costas Tracking with Phase-Noise Rejection.

FIGS. 10 and 11 plot the simulation results for second-order and third-order Costas tracking. Note that the squaring losses become significant as the $C/N_0$ approaches 17 dB-Hz (Eb/No=0 dB), and the threshold extension is not as notable. Nevertheless, 3 dB of extension is produced by the common-mode phase estimation algorithm.

Flicker-Frequency Noise

White-frequency noise is assumed for the linear optimization performed above since linear optimization for 1/f noise is intractable. However, the frequency-noise spectral characteristic in the 1 to 10 Hz region is 1/f for typical TCXOs. Furthermore, the tracking degradation due to flicker-frequency noise is more prominent than for white-frequency noise. Consequently, the design approach for white-frequency noise is evaluated for flicker-frequency noise using computer simulation.

The simulation model is identical to FIG. 8, except that the oscillator frequency noise is generated as 1/f-frequency noise by filtering white Gaussian with an FIR filter; the frequency noise is then integrated to yield phase noise. The FIR filter response has an approximate 1/f characteristic over the frequency range of 0.01 Hz to 10 Hz. The resulting phase noise spectrum is $$S_\phi(f) = \frac{f_c^2 h_{-1}}{f^3}$$

Figure 13:
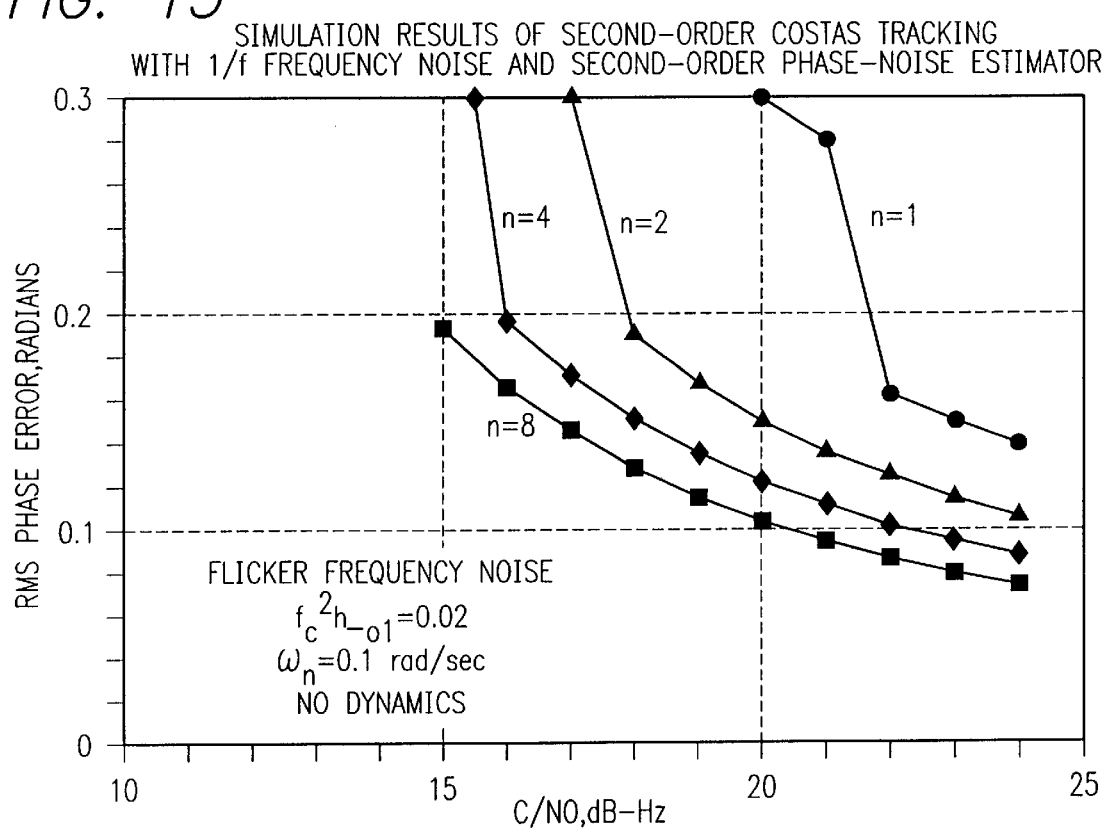
FIG. 13. Simulation Results of Second-Order Costas Tracking with 1/f Frequency Noise and Second-Order Phase-Noise Estimator.

FIG. 12 plots the simulation results for second-order Costas tracking with 1/f frequency noise. The threshold performance is comparable to white-frequency noise perturbations; however, the phase error increases faster as the $C/N_0$ drops. This may be due to the fact that the first-order common-phase estimator is not matched to the 1/f frequency noise. Consequently, a second-order estimator with form $$G(s)=g_1/ns+g_2/ns^2$$

was also simulated; the results are shown in FIG. 13. There is a very slight improvement with the second-order estimator, but not significant enough to warrant its use.

Acquisition of Signal & Oscillator

Acquisition behavior is evaluated now. In the normal case, all signals are independently acquired at relatively high $C/N_0$ with bandwidths wide enough to accommodate the oscillator phase noise. After all signals have been acquired, the common-phase noise estimator is acquired and the signal-tracking loops can then be narrowed to tolerate higher J/S levels. While tracking in the high-J/S, it is necessary to acquire new signals or reacquire signals lost due to shading. Consequently, the ability to reacquire 1 or more signals at a high J/S level is necessary. It is also desirable to characterize the acquisition behavior when 2 or fewer signals have been tracked.

Acquisition behavior is simulated as follows. An eight channel system designed to accommodate flicker frequency noise of $f_c^2 h_{-1}=0.02$ with $\omega_n=0.1$ rad/second is simulated. After tracking 8-m signals, the simulation attempts to acquire m new signals at t=0. The new signals have an initial frequency error of $3w_n$ and an initial phase error that is uniformly distributed over 0 to $2\Pi$. The simulation defines acquisition as all tracking loops having not "slipped" for the last previous 1000 bit intervals. This means that the shortest possible acquisition time is 20 seconds.

Figure 14:
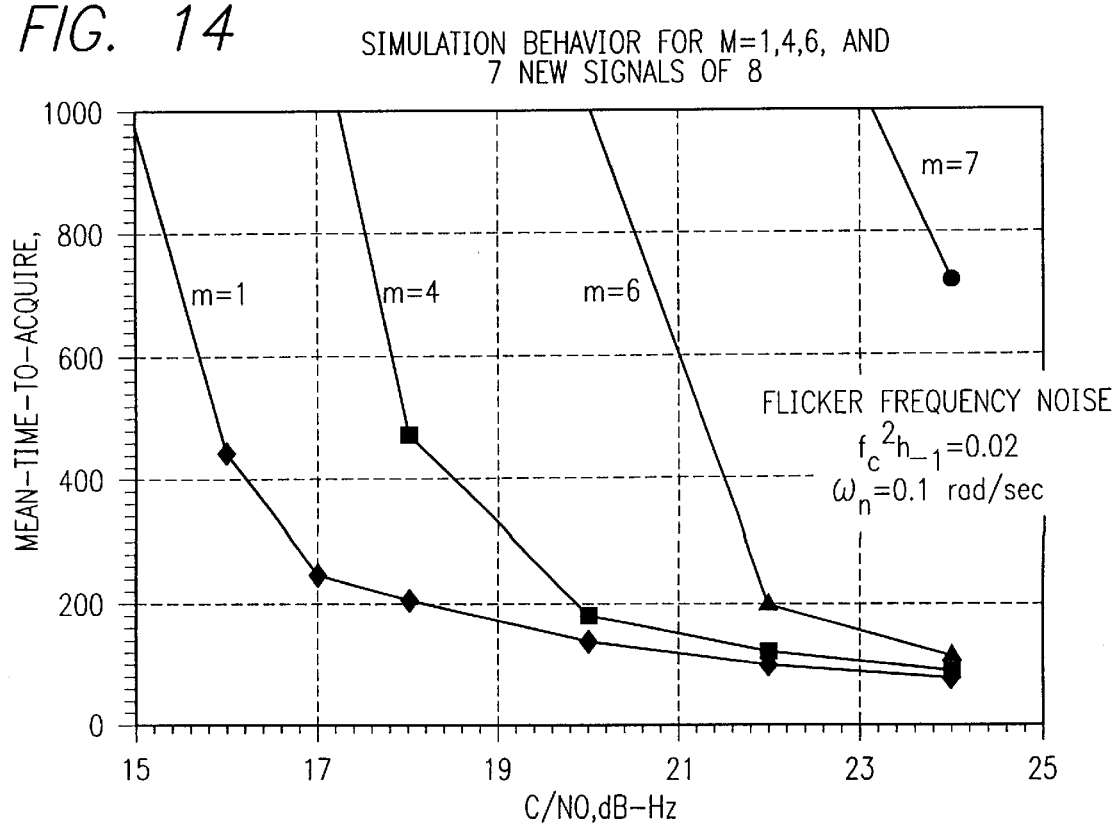
FIG. 14. Plot of the resulting mean-time-to-acquire versus $C/N_0$ for m=1, 4, 6, and 7 signals.

FIG. 14 plots the resulting mean-time-to-acquire versus $C/N_0$ for m=1, 4, 6, and 7 signals. One, and possibly two, signals can be acquired while subjected to the full J/S; however, as the number of signals that have been acquired and are being tracked becomes small, the phase noise estimator is less effective and the system is unable to acquire at high levels of J/S. Since high jamming levels that cause loss of all signals are normally short-term events (i.e., terminal phase of a mission), the need to acquire a complete set of signals during jamming is not likely.

Proposed Implementation

It is anticipated that the method disclosed could be implemented by means of a computer program running within the microprocessor controlling the GPS receiver. It is also possible that the method could be implemented within the integrated circuit which makes up a portion of the a multichannel receiver with connections to each of the multiple receiver channels.

Example Implementation

The following Fortran program is offered as an example of one possible embodiment of the disclosed method.

```
C ************
c       Simulation program
*          osc2n1f.for    2nd-order Costas, Flicker Freq noise
           double precision ave,var,avetym,phivar,oscvar
           real phi(12) ,phid(12) ,phidd(12)
           Open (Unit=5,File='osc2f1.IN')
           Open (Unit=7,File='osc2f1.OUT')
           Slip = 3.14159265
           wn = .1
           t = .020
```

-continued

```
           q = (.01/2)*wn**4    *0
           hbits = 1000*50 /10
    1      read(5,*) dB,ntyms,nchan, h1,ooo   ,wn   ,qqq
           if(ntyms.le.0) stop
           do 199 idB=13,24,   1
           dB=idB
c             qqq = 1
c             do 199 iwn=-4,4
c             wn = wn0*1.257**(iwn)
           cn0=10.** (dB/10.)
           rn =1./sqrt(2*cn0*t)
           ro =(1.+25/cn0)/(2*cn0)
           qn =t*t*sqrt(Q/t)
           hn =t*t*(6.2832**1.5)*sqrt(.5*h1/t)/sqrt(3.14159)
           hn=hn* (1.761/.1929)
           ir=1+444*ntyms
           ave = 0
           var = 0
           avetym = 0
           phivar = 0
           oscvar = 0
           c1 = 1.414*wn*t
           c2 = (wn*t)**2
           own = sqrt(nchan*.5*h1/ro)    *qqq    *1.67
              write(6,62)      qqq,h1,cn0,own, own*ro
              write(7,62)      qqq,h1,cn0,own, own*ro
c
c
c    62     format(6f12.5)
           o1 = own*t/nchan
           if(nchan.eq.1) o1=o1*ooo
           do 99 itym=1,ntyms
           slippd=0
           osc=0
           dummy=flickr(0.0)
           do 3 i=1,nchan
           phi(i) =0
           phid(i)=0
    3      phidd(i)=0
           do 99 ibit=1,nbits
           esum = 0
           do 88 ichan=1,nchan
           d = sign(1.,snorm(ir))
           ang = phi(ichan) + osc
           x = d*cos(ang) + rn*snorm(ir)
           y = d*sin(ang) + rn*snorm(ir)
           e = -y*sign(1.,x)
           esum = esum + e
           phid(ichan) = phid(ichan) + c2*e
           phi(ichan) = phi(ichan) + phid(ichan) + c1*e
c          if(ang.gt.slip) then
c             ang = ang - slip
c             if(slippd.eq.0) then
c             slippd = 1
c             time(1+ibit/10) = time(1+ibit/10) + 1./(nchan*ntyms)
c             avetym = avetym+ibit/50.
c             endif
           elseif(ang.lt.-slip) then
c             if(slippd.eq.0) then
c             slippd = 1
c             ang = ang + slip
c             time(1+ibit/10) = time(1+ibit/10) + 1./(nchan*ntyms)
c             avetym = avetym+ibit/50.
c             endif
c          endif
           ang = phimod(ang)
           var = var + ang*ang
           ave = ave + ang
           pha = phi(ichan)
           phivar = phivar + phimod(pha)**2
           oscvar = oscvar + phimod(osc)**2
    88     continue
           osc = osc + o1*esum + hn*flickr(snorm(ir))
    99     continue
           ave=ave/(nbits*ntyms*nchan)
           RMS=sqrt(var/(nbits*ntyms*nchan)-ave*ave)
           phivar=sqrt(phivar/(nbits*ntyms*nchan))
           oscvar=sqrt(oscvar/(nbits*ntyms*nchan))
c          if(avetym.ne.0) avetym =
     avetym/(nchan*ntyms*time(1+nbits/10))
              write(6,66) dB, RMS, h1, wn, own, nchan,nbits,ntyms
```

```
                write(7,66) dB, RMS, h1, wn, own, nchan,nbits,ntyms
         66     format(f8.1,4f12.5,3i10)
         199    continue
                goto 1
                end
      C *************
                Function phimod(x)
                data pi/3.14159265/
                phimod = x
                if(phimod.gt.pi) phimod = phimod - int(phimod/pi)*pi
                if(phimod.lt.-pi) phimod = phimod + int(-phimod/pi)*pi
                end
      C *************
      C         Gaussian Random Number Generator
                Function snorm(ir)
                Data mult/16#278DDE6D/
                ir=mult*ir
                y=0.5 + Float(ir)/4.294968e9
                y = Sqrt(-2.*Alog(y))
                ir=mult*ir
                x = Float(ir)/4.294968e9
                snorm = y*Cos(6.2831853*x)
                Return
                End
      C *************
                Function Flickr (x)
                dimension h(4096),r(4096)
                double precision sum
                data ir/1/
                if(x.eq.0.0) then
                   do 1 k=1,4096
                   r(k) = snorm(ir)
         1         h(k) = k**(-.6)/sqrt(3.14159)
                else
                   sum = x*h(1)
                   do 2 k=4096,2,-1
                   sum = sum + r(k)*h(k)
         2         r(k) = r(k-1)
                   r(1) = x
                   flickr=sum
                endif
                End
```

What is claimed:

1. A radio receiver including: a plurality of receiving channels, and a common clock source having an inherent phase noise, each receiving channel having at least one section adapted to track the carrier phase portion of a signal broadcast from one of a plurality of source transmitters, wherein each receiving channel section adapted to track carrier phase obtains timing signals from the common clock source, the receiver further comprising:

a tracking filter for estimating the phase noise of the common clock source;

said tracking filter receiving measurements from the plurality of receiving channels that are actively tracking the carrier phase of the source transmitters' signals;

said filter deriving from said measurements from the plurality of receiving channels an estimate of the phase noise of said common clock source; and said receiver utilizing the estimate of the noise of the common clock source back in the sections of the receiver channels adapted to track the carrier phase to reduce common clock phase noise from each channels' measurement of carrier phase.

2. The radio receiver of claim 1, wherein the radio receiver is a receiver adapted for use in determining information about position.

3. The radio receiver of claim 1, wherein the radio receiver is adapted to track signals broadcast from the transmitters of the NAVSTAR Global Positioning System (GPS).

4. The radio receiver of claim 1, wherein the radio receiver is a receiver adapted for use in determining information about time from data contained in the broadcast signal.

5. The radio receiver of claim 1, wherein the tracking filter for estimating the phase noise of the common clock source is an optimal or sub-optimal estimation filter.

6. The radio receiver of claim 1, wherein the tracking filter for estimating the phase noise of the common clock source is a least squares filter.

7. The radio receiver of claim 1, wherein the tracking filter for estimating the phase noise of the common clock source is a Kalman type filter.

8. The radio receiver of claim 1, wherein the tracking filter for estimating the phase noise of the common clock source is configured to track the second order dynamics of the source transmitters' signals.

9. The radio receiver of claim 1, wherein the tracking filter for estimating the phase noise of the common clock source is configured to track at least the third order dynamics of the source transmitters' signals.

10. A method of using receiver phase noise mitigation to improve performance in the presence of an interfering signal, the receiver having a common clock source with an inherent phase noise suppplying timing signals to multiple receiving channels adapted to track the phase of a signal, comprising the steps of:

acquiring carrier phase tracking of two or more signals in the multichannel receiver using a wide bandwidth;

acquiring track of common clock source phase noise in a tracking filter, using as input the tracked carrier phase of the two or more signals, to produce an estimate of the common clock source phase noise;

adding the estimate of the common clock source phase noise to the carrier phase tracking of the two or more signals; and reducing the bandwidth of the carrier phase tracking relative to the number of signals contributing to the common clock source phase noise tracking loop thereby increasing the receivers resistance to an interfering signal.

11. A radio receiver including: a plurality of receiving channels having at least one section for measuring the phase portion of a signal broadcast from one of a plurality of transmitting sources, and a common clock source having an inherent phase noise and providing a common timing signal to all of the plurality of receiving channels, the receiver further comprising:

a tracking filter for estimating both the phase noise of the common clock source and the phase angle of each of the signals being measured by the plurality of receiving channels;

said tracking filter receiving phase measurements from the plurality of receiving channels that are actively measuring the phase portion of the transmitter sources;

said filter deriving from the phase measurements from the plurality of receiving channels, and the previous state of the filter, an estimate of the phase noise of said common clock source along with an estimate of the phase angle for each of the transmitter source signals being tracked corrected for the common clock phase noise.

12. The radio receiver of claim 11, wherein the radio receiver is a receiver adapted for use in determining information about position from data contained in the broadcast signal.

13. The radio receiver of claim 11, wherein the radio receiver is adapted to track signals broadcast from the transmitters of the NAVSTAR Global Positioning System (GPS).

14. The radio receiver of claim 11, wherein the radio receiver is a receiver adapted for use in determining information about time from data contained in the broadcast signal.

15. The radio receiver of claim 11, wherein the tracking filter for estimating the phase noise of the common clock source, and the phase angle of each of the signals being measured by the plurality of receiving channels, is an optimal or sub-optimal estimation filter.

16. The radio receiver of claim 11, wherein the tracking filter for estimating the phase noise of the common clock source, and the phase angle of each of the signals being measured by the plurality of receiving channels, uses a Kalman-Bucy estimator.

17. The radio receiver of claim 11, wherein the tracking filter for estimating the phase noise of the common clock source, and the phase angle of each of the signals being measured by the plurality of receiving channels, is configured to track the second order dynamics of the signals being measured by the plurality of receiving channels.

18. The radio receiver of claim 11, wherein the tracking filter for estimating the phase noise of the common clock source, and the phase angle of each of the signals being measured by the plurality of receiving channels, is configured to track the dynamics of the third order or above of the signals being measured by the plurality of receiving channels.

19. A method of reducing phase noise in a multichannel radio receiver in which the multiple receiver channels derive a clocking signal from a common source, comprising the steps of:

measuring the phase of the signals actively being received by each of a plurality of actively receiving receiver channels;

presenting the measured phases to the input of an estimation filter having states for at least common mode phase noise and phase angles for each of the actively received channels;

solving for all said the filter states;

correcting each of the resultant estimates of phase angle by removing the estimate of common mode phase noise.

20. The method of claim 19, wherein the estimation filter used also includes states for one or more derivatives of the phase angle with respect to time for each of the actively received channels.

21. The method of claim 20, adding an additional step before solving for all said filter states, the step comprising of propagating the measurements of phase angle at the input of the filter forward to a common time based on the current estimates of the derivatives of the phase angle.

22. An iterative method of reducing phase noise in a multichannel radio receiver in which the multiple receiver channels are driven by a clock signal from a common source and have an unknown clock phase noise $\Phi_0$, the iterative method being performed to continuously calculate a current estimate of the clock phase noise $\Phi_0$ and corresponding current estimates of phase($\hat{\Phi}_0+\hat{\theta}_n$) when two or more channels (1 to n) are actively tracking signals, comprising the steps of:

sampling the phase of each of the signals $\theta_n$ in the receiver channels;

summing the current estimate of clock phase noise and a corresponding current filter estimate of phase($\hat{\Phi}_0+\hat{\theta}_n$) to produce a current sum;

subtracting the sampled phases $\theta_n$ from the current sum to produce phase errors $e_n$;

presenting the phase errors $e_n$ as input to estimation filters in order to output portions of the estimate of common mode phase noise $\hat{\Phi}_{0_n}$ and simultaneously presenting the phase errors $e_n$ as input to loop filters having as outputs at least the estimated phases $\hat{\theta}_n$ of the tracked signals;

solving for filtered values in all common mode phase noise filters and loop filters;

summing all the outputs from the common mode phase noise filters $\hat{\Phi}_{0_n}$ together to produce a single current estimate of common mode phase noise $\hat{\Phi}_0$; and adding the single current estimate of common mode phase noise $\hat{\Phi}_0$ to the estimations of phase from the loop filters $\hat{\theta}_n$ to produce new current estimates of phase ($\hat{\Phi}_0+\hat{\theta}_n$).

23. The method of claim 22, wherein the estimation filter used for estimating a portion of the common phase noise filter is an optimal or sub-optimal estimation filter.

24. The method of claim 22, wherein the estimation filter used for estimating a portion of the common phase noise filter is a least squares filter.

25. The method of claim 22, wherein the loop filters used are phase locked loop filters.

26. The method of claim 22, wherein the loop filters used are Costas loop filters.

* * * * *

UNITED STATES PATENT AND TRADEMARK OFFICE
CERTIFICATE OF CORRECTION

PATENT NO. : 6,081,228
DATED : Jun. 27, 2000
INVENTOR(S) : Donald Leimer

It is certified that error appears in the above-identified patent and that said Letters Patent is hereby corrected as shown below:

Title page, under "ABSTRACT", fifth line of text, change "C/No", to read --$C/N_O$--.

Column 2, line 10, change "receiving channels", to read --receiving channel--.

Column 3, line 25, change "receivers", to read --receivers'--.

Column 10, line 13, claim 7, change "Kalman type filter", to read --Kalman filter--.

Signed and Sealed this

Eighth Day of May, 2001

Attest:

NICHOLAS P. GODICI

Attesting Officer

Acting Director of the United States Patent and Trademark Office